United States Patent [19]

Apel et al.

[11] 4,444,083
[45] Apr. 24, 1984

[54] KEYBOARD INSTRUMENT, ESPECIALLY A PIANO OR SIMILAR INSTRUMENT

[76] Inventors: Siegfried Apel, Ziegenrückstr. 24; Marlene Apel, Kellerstr. 9, both of D-8647 Stockheim, Fed. Rep. of Germany

[21] Appl. No.: 344,640

[22] Filed: Feb. 1, 1982

[30] Foreign Application Priority Data

Feb. 17, 1981 [DE] Fed. Rep. of Germany ....... 3105724

[51] Int. Cl.³ .......................... G10C 3/12; G10G 1/02
[52] U.S. Cl. ............................... 84/423 R; 84/471 R; 84/472; 84/473; 84/480
[58] Field of Search .................... 84/423 R, 438, 451, 84/471 R, 472, 477 R, 478, 480–482, 445–449

[56] References Cited

U.S. PATENT DOCUMENTS

| | | | |
|---|---|---|---|
| 362,333 | 5/1887 | Tayoux | 84/482 |
| 2,028,809 | 1/1936 | Shannon | 84/471 R |
| 2,497,364 | 2/1950 | Mayberry | 84/477 R |
| 2,885,921 | 5/1959 | Goldhammer | 84/423 R |
| 3,165,022 | 1/1965 | Yokoyama | 84/423 X |
| 3,460,426 | 8/1969 | Jensen | 84/478 |
| 4,091,702 | 5/1978 | Murakami | 84/423 X |

FOREIGN PATENT DOCUMENTS 2028564 3/1980 United Kingdom ............ 84/471 R

Primary Examiner—Lawerence R. Franklin
Attorney, Agent, or Firm—Max Fogiel

[57] ABSTRACT

Keyboard instrument, in particular a piano or similar instrument that has keys and that can be used in conjunction with aids to learning in the form of templates, characterized in that, of the white keys (long keys 2) that form the C-major scale, the width (b) of the keys that produce the notes B, C, E, and R is ¼ less than the width (B) of the remaining keys, which produce the notes D, G, and A, so that the ratio of the width of the equally wide keys for B, C, E, and F to the width of the equally wide keys for D, G, and A is 3:4. Templates that are separated into a number of adjacent divisions (5) that are equally wide, each division (5) being ½ the width (b) of one D, G, or A key, so that three adjacent divisions (5) will be as wide as two B, C, E, or F keys and two divisions (5) will be as wide as one D, G, or A key can be placed over the keyboard to represent all possible scales, thirds, triads, and tetrads with their inversions, major and minor intervals, cadenzas, transpositions, etc.

15 Claims, 4 Drawing Figures

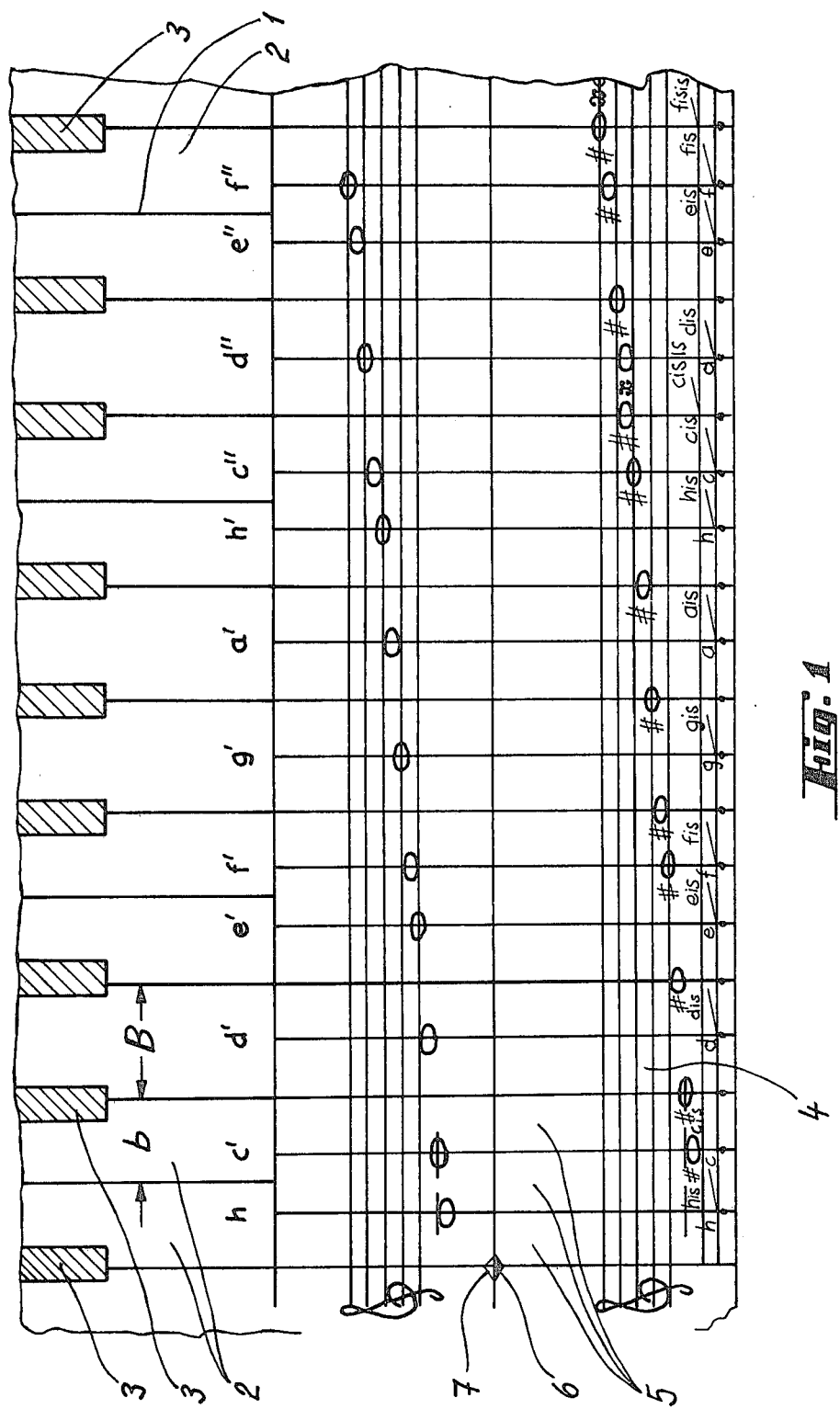

U.S. Patent   Apr. 24, 1984   Sheet 2 of 3   4,444,083
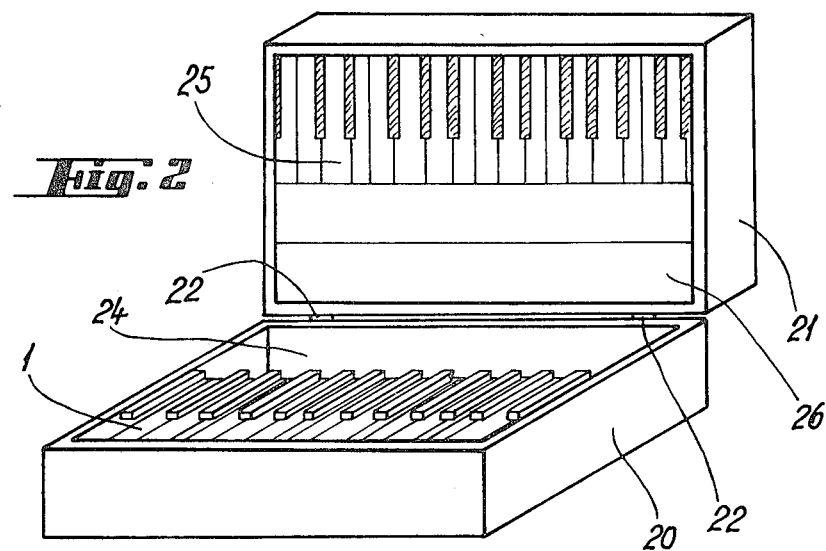
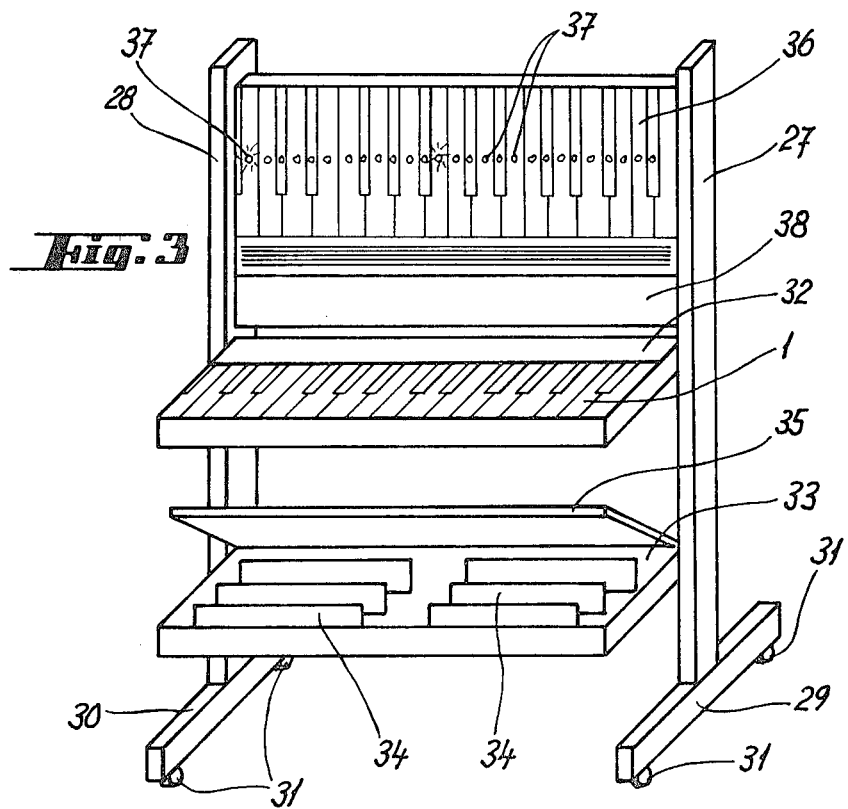

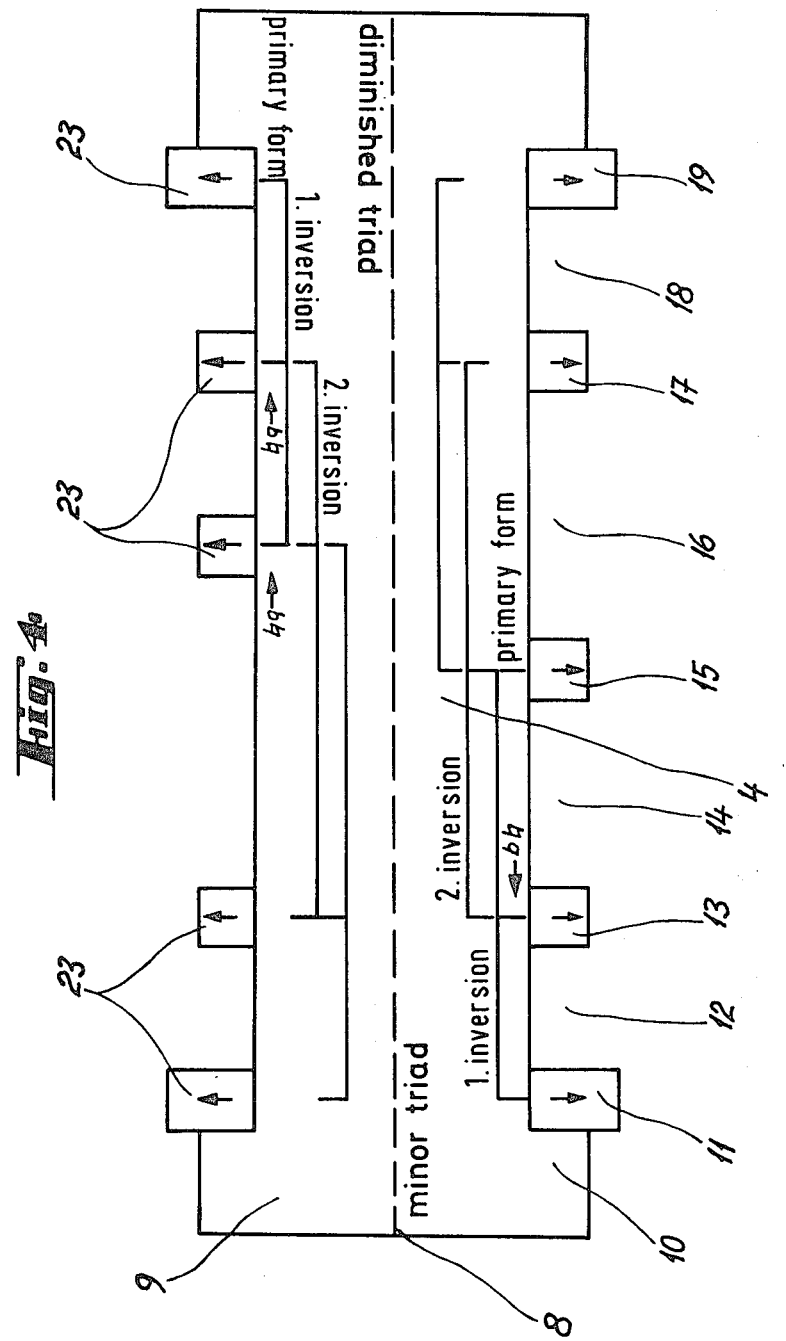

KEYBOARD INSTRUMENT, ESPECIALLY A PIANO OR SIMILAR INSTRUMENT

The invention is a keyboard instrument, especially a piano or similar instrument that has keys and that can be used in conjunction with aids to learning in the form of templates.

A keyboard shall be understood to mean the total number of keys in a keyboard instrument (organ, piano, clavichord, etc.). It consists of seven white long keys and five black sharp keys per octave, with the long keys making up the C-major scale. The keyboard extends over a number of octaves that depends on the width of the particular instrument.

In conventional keyboards, the white keys are of equal width. It is not possible to employ learning aids in the form of templates that represent all the harmonic forms with such keyboards. The known keyboards also do not permit people with small hands, especially children to span very many keys.

The invention is intended as a keyboard instrument that allows the use of templates and provides either a wider tonal range in the same size instrument or the same tonal range in a smaller instrument. It is also intended in particular to significantly facilitate the spanning involved in such activities as transposing up or down and playing octaves, ninths, and tenths, playing chords with keynote, third, and fifth, and playing cadenzas and arpeggios, especially for people with small hands.

The invention attains these objectives by means of the characteristics described in the body of the major claim, while other practical and desirable developments result from characteristics described in the subsidiary claims.

Narrowing certain keys as described will decrease the total width of the keyboard and hence of the instrument itself. The keyboard will be easier to play. Above all, however, it will lead to uniformly distributed template placement, which will considerably accelerate and abbreviate learning.

Whole and half steps are in accordance with the invention represented visually on the templates. The position of all tones and of all sharp and double-sharp elevations, of all flat and double-flat drops, and of any resolutions necessary can be seen simultaneously in staff notation and on the keyboard at a glance, which considerably promotes comprehension.

The invention illustrates all scales, thirds, triads, and tetrads as well as their inversions, major and minor intervals, cadenzas, and transpositions both visually and aurally with the assistance of appropriately designed templates, a teaching diagram of the keyboard in accordance with the invention, and/or an instrument with a keyboard in accordance with the invention. The templates allows the student to easily discover, become familiar with, name, and practice the harmonic forms being taught.

Some embodiments of the invention will now be specified with reference to the drawings, in which FIG. 1 shows a section through the keyboard of a musical instrument with uniform placement distribution and with a template in place, FIG. 2 is a box-shaped musical instrument, FIG. 3 a musical instrument with a teaching diagram, and FIG. 4 a template with punched-out divisions representing the example of a diminished or minor third.

FIG. 1 is a section through the keyboard of a piano. Keyboard 1 has seven long keys 2 and five sharp keys 3 per octave. Long keys 2 are also referred to as "white" keys and sharp keys 3 as "black" keys in accordance with the conventional piano-keyboard color scheme. Long keys 2 are used to activate the notes C, D, E, F, G, A, and B. As will be evident from FIG. 1, the keys for B, C, E, and F are narrower than those for the notes D, G, and A. The width b of these narrow keys is actually ¼ less than the width B of the other keys. The keys for the notes B (h', h", etc.), C (c', c", etc.), E (e', e", etc.), and F (f', f", etc.) are thus μ as wide as the keys for D (d', d", etc.), G (g', g", etc.), and A (a', a", etc.).

FIG. 1 also shows as an example a template 4 that is separated into a number of adjacent divisions 5. All of these divisions are equally wide and two adjacent divisions are as wide as one D, G, or A key, whereas, as will be obvious from what has been stated above with respect to the ratio between the widths of the two types of long key 2, three adjacent divisions will be as wide as two B, C, E, or F keys. Also, the width of one direction 5 will equal ½ the width B of one D, G, or A key.

Each template 4 is printed with a mark 7 that matches a corresponding mark 6 on the keyboard when the template is correctly placed on the keyboard. The uniform distribution and width of the individual divisions 5 will thus allow the templates to be uniformly placed, assuming of course that the widths of the various long keys 2 are as described. The template 4 in FIG. 1 can be placed directly over keyboard 1. It is made of cardboard or an appropriate plastic.

FIG. 4 shows another template 4 that represents two harmonic forms, here the minor and the diminished third. This template 4 has a longitudinal fold 8, along which it can be folded to form two legs 9 and 10 so that the template can stand up. Each leg also represents one harmonic form, leg 9 the diminished third and leg 10 the minor third. Certain divisions 3 are punched out, leaving the other divisions intact, to correspond with different harmonic forms. For the minor third (leg 10), the first division 11 is left intact, the next two divisions are punched out (empty space 12), the next division 13 is also intact, and there follows another empty space 14 that is as wide as three divisions, an intact division 15, an empty space 16 as wide as four divisions, an intact division 17, a two division-wide space 18, and finally an intact division 19. If templates 4 are transfer printed, the divisions to be punched out can be scored so that the pupil himself can do it himself. The templates can be designed to represent any harmonic form—major seventh tetrad (dominant seventh), major scale (Ionian mode), major triad, augmented triad, the pentatonic scale, the Dorian mode, and the Phrygian mode, etc., for example—so that a full course of study can be involved.

FIG. 2 illustrates a box-shaped instrument that employs the specified keyboard 1. This instrument, which has been specially conceived for didactic purposes, consists essentially of a bottom section 20 with the keyboard 1 and a top section 21 in the form of a cover that is connected by hinges (22) to the bottom section. Behind keyboard 1 in bottom section 20 is an empty space 24 for standing up the required templates 4. When a template 4 is stood or set up, its intact divisions (in FIG. 4: divisions 11, 13, 15, 17, and 19 for the minor third and divisions 23 for the diminished third) indicate all the keys associated with the harmonic form in question.

There is in upper section 21 a keyboard diagram 25 that illustrates the design and layout of the keys in accordance with the invention. This diagram allows the correct notation and designation to be read off in conjunction with the templates by means of raising, lowering, and resolution. The upper 20 and lower 21 sections of the box are made of wood or plastic. Below keyboard diagram 25 is another depositing surface 26 or empty space for storing the various templates.

FIG. 3 shows another musical or musical-instruction instrument. Keyboard 1 is mounted between two vertical posts 27 and 28. The keyboard is made in the form of a play table. Posts 27 and 28 rest on transverse supports 29 and 30. There are casters 31 on the bottom of supports 29 and 30 to facilitate moving the instrument. This instrument also has a stand-up surface 32 for templates 4. A storage box 33 for the templates is suspended under the play table with its keyboard 1 and between posts 27 and 28. Box 33 is divided into compartments 34 and has a hinged cover 35 to protect the templates from dust and damage.

Above the play table is a keyboard diagram 36 with lamps that correspond to each key in keyboard 1 and that light up when that key is pressed, providing information to both the pupil and the teacher. Below the keyboard diagram again is a magnetic template-display surface 38 that will securely hold templates of an appropriate material.

The instruments described above can produce their sounds by various methods, mechanically or electronically for example. Such instruments are especially practical for schools, although they can also be employed to great advantage, especially because of the templates, for self-instruction.

We claim:

1. A keyboard instrument, in particular a piano or similar instrument having a keyboard with keys arranged such that each C-major scale octave consists of seven white keys which sequentially produce the notes C, D, E, F, G, A, and B and five black keys which produce the notes C', D', F', G', and A', one end of said black keys terminating along a smooth continuous line and the corresponding ends of each said white keys having a portion extending equidistant beyond said line, said keyboard being usable in conjunction with aids to learning in the form of templates, the improvement comprising: the width of said portion of the white keys that produce the notes B, C, E, and F having a first value and the width of said portion of the white keys that produce the notes D, G, and A having a second value, the ratio of said first value to said second value being 3:4.

2. Keyboard instrument as defined in claim 1, and templates separated into a number of adjacent divisions that are equally wide, each division being ½ said second value, i.e., the width of one D, G, or A key, so that three adjacent divisions will be twice said first value, i.e., as wide as two B, C, E, or F keys and two divisions will be equal to said first value, i.e., as wide as one D, G, or A key.

3. Keyboard instrument as defined in claim 2, wherein said templates are placeable directly over the keyboard, some of the divisions in each template being punched out and other divisions projecting tonguelike outward to represent various musical scales and harmonic forms.

4. Keyboard instrument as defined in claim 2 or 3, wherein said templates are comprised of cardboard.

5. A keyboard instrument as defined in claim 2 or 3, wherein said templates are comprised of plastic.

6. Keyboard instrument as defined in claim 1, and for use as an instructional device in schools, wherein the keyboard is mounted in a wooden or plastic box having a bottom section and a top section in form of a cover accepting and storing the templates and being connected by hinges to said bottom section.

7. Keyboard instrument as defined in claim 1, wherein the keyboard is mounted on a play table suspended between two vertical posts, a keyboard diagram above said play table and having displays indicating whatever keys in the keyboard are being pressed, and a box under the play table for storing and protecting unused templates, said box being also suspended between the posts.

8. Keyboard instrument as defined in claim 6 or 7, wherein an empty space is located behind the keyboard for standing up required templates.

9. Keyboard instrument as defined in claim 7, including a magnetic surface underneath the keyboard diagram for holding templates when in use.

10. Keyboard instrument as defined in claim 7, wherein said storage box is divided into compartments.

11. Keyboard instrument as defined in claim 7, wherein each post rests on transverse supports with casters on the bottom.

12. Keyboard instrument as defined in claim 1, wherein sound is produced mechanically.

13. Keyboard instrument as defined in claim 1, wherein said templates can be folded to form two legs so that they can stand up, each leg also representing a different harmonic form.

14. A keyboard instrument as defined in claim 1, wherein sound is produced electronically.

15. A keyboard instrument as defined in claim 1 and templates separated into a number of adjacent divisions that are equally wide, each division being ½ the width of one D, G, or A key, so that three adjacent divisions will be as wide as two B, C, E, or F keys and two divisions will be as wide as one D, G, or A key, said templates being placeable directly over the keyboard, some of the divisions in each template being punched out and other divisions projecting tonguelike outward to represent various musical scales and harmonic forms, said keyboard being mounted on a play table suspended between two vertical posts, a keyboard diagram above said play table and having displays indicating whatever keys in the keyboard are being pressed and a box under the play table for storing and protecting unused templates, said box being also suspended between the posts, an empty space being located behind the keyboard for standing up required templates, a magnetic surface underneath the keyboard diagram for holding templates when in use, said storage box being divided into compartments, each post resting on transverse supports with casters on the bottom, said templates being foldable to form two legs so that they can stand up, each leg also representing a different harmonic form.

* * * * *